(12) United States Patent
Tomioka

(10) Patent No.: US 12,697,970 B2
(45) Date of Patent: Aug. 4, 2026

(54) CONTROL DEVICE AND CONTROL METHOD FOR RESTART OF SPEED CONTROL OF A VEHICLE

(71) Applicant: HONDA MOTOR CO., LTD., Tokyo (JP)

(72) Inventor: Kazuki Tomioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 18/370,018

(22) Filed: Sep. 19, 2023

(65) Prior Publication Data

US 2024/0101112 A1     Mar. 28, 2024

(30) Foreign Application Priority Data

Sep. 28, 2022    (JP) ................................. 2022-155271

(51) Int. Cl.
*B60W 30/14*          (2006.01)
*B60W 30/18*          (2012.01)
        (Continued)

(52) U.S. Cl.
CPC .... *B60W 30/143* (2013.01); *B60W 30/18018* (2013.01); *B60W 40/105* (2013.01);
        (Continued)

(58) Field of Classification Search
CPC .. B60W 30/146; B60W 30/143; B60W 30/14; B60W 30/18018; B60W 50/14;
        (Continued)

(56) References Cited

U.S. PATENT DOCUMENTS 6,138,071 A * 10/2000 Sekine ................. B60K 31/042
                                                              180/170
6,878,096 B1 * 4/2005 Winner ................... B60T 1/062
                                                              701/96
        (Continued)

FOREIGN PATENT DOCUMENTS

DE        102016223348 A1 * 6/2017    ......... G08G 1/09626
JP        H01-202540 A      8/1989
        (Continued)

OTHER PUBLICATIONS

K. Lee, "BMW wants customers to pay a subscription fee to use features the car already has installed, like a heated steering wheel or adaptive cruise control", Jul. 8, 2020, Business Insider, https://www. businessinsider.com/bmw-subscription-model-for-features-2020-7 (Year: 2020).*

(Continued)

*Primary Examiner* — Erin M Piateski
*Assistant Examiner* — Ashley Tiffany Schoech
(74) *Attorney, Agent, or Firm* — THOMAS | HORSTEMEYER, LLP

(57)          ABSTRACT

A control device for a vehicle includes a travel control unit configured to provide a speed control function for automatically controlling a speed and configured to interrupt an operation of the speed control function in response to a braking operation element of the vehicle being operated by a driver during the operation of the speed control function, and a proposal unit configured to provide a restart proposal to the driver to restart the operation of the speed control function when the driver stops the vehicle while the operation of the speed control function is interrupted. When the driver agrees with the restart proposal, the travel control unit restarts the operation of the speed control function and keeps the vehicle stopped by the speed control function. The (Continued)

agreement with the restart proposal is made by the driver terminating an operation of the braking operation element.

8 Claims, 5 Drawing Sheets

(51) Int. Cl.
*B60W 40/105* (2012.01)
*B60W 50/14* (2020.01)

(52) U.S. Cl.
CPC ....... *B60W 50/14* (2013.01); *B60W 2050/146* (2013.01); *B60W 2540/12* (2013.01)

(58) Field of Classification Search
CPC ..... B60W 2050/143; B60W 2050/146; B60W 50/16; B60W 2540/12; B60W 2540/14; B60W 2540/18
See application file for complete search history.

(56) References Cited

U.S. PATENT DOCUMENTS

| | | | |
|---|---|---|---|
| 7,216,027 B2 | 5/2007 | Arai et al. | |
| 7,477,979 B2 | 1/2009 | Arai et al. | |
| 7,965,224 B2 | 6/2011 | Kikuchi | |
| 8,396,641 B2 * | 3/2013 | Maruyama | B60W 10/184 701/96 |
| 10,093,316 B2 | 10/2018 | Kumai et al. | |
| 11,273,847 B2 | 3/2022 | Tsuda | |
| 11,299,156 B2 | 4/2022 | Kato et al. | |
| 11,325,598 B2 | 5/2022 | Goto et al. | |
| 11,618,466 B2 | 4/2023 | Kobayashi et al. | |
| 11,814,048 B2 | 11/2023 | Kato et al. | |
| 2005/0203693 A1 | 9/2005 | Arai et al. | |
| 2005/0216168 A1 | 9/2005 | Arai et al. | |
| 2009/0135049 A1 | 5/2009 | Kikuchi | |
| 2017/0001642 A1 | 1/2017 | Kumai et al. | |
| 2017/0043778 A1 * | 2/2017 | Kelly | B60W 30/143 |
| 2018/0079411 A1 * | 3/2018 | Inoguchi | B60W 30/143 |
| 2019/0322291 A1 | 10/2019 | Tsuda | |
| 2020/0290615 A1 | 9/2020 | Kato et al. | |
| 2021/0188268 A1 | 6/2021 | Goto et al. | |
| 2021/0237753 A1 | 8/2021 | Kobayashi et al. | |
| 2021/0387622 A1 | 12/2021 | Kudo | |
| 2021/0402993 A1 | 12/2021 | Zhao et al. | |
| 2022/0089158 A1 | 3/2022 | Kato et al. | |

FOREIGN PATENT DOCUMENTS

| | | | | | |
|---|---|---|---|---|---|
| JP | H02-16328 U | | 2/1990 | | |
| JP | H08-192657 A | | 7/1996 | | |
| JP | H09-290665 A | | 11/1997 | | |
| JP | H11-175897 A | | 7/1999 | | |
| JP | 2002-120596 A | | 4/2002 | | |
| JP | 2005-001566 A | | 1/2005 | | |
| JP | 2005-255087 A | | 9/2005 | | |
| JP | 2008-201393 A | | 9/2008 | | |
| JP | 2008-299758 A | | 12/2008 | | |
| JP | 4230385 B2 | | 2/2009 | | |
| JP | 2009-128275 A | | 6/2009 | | |
| JP | 2010-151829 A | | 7/2010 | | |
| JP | 2017-013614 A | | 1/2017 | | |
| JP | 2018-001962 A | | 1/2018 | | |
| JP | 2020147178 A | * | 9/2020 | ........... | B60W 30/17 |
| JP | 2021-123129 A | | 8/2021 | | |
| JP | 2021-194971 A | | 12/2021 | | |
| WO | 2018/074586 A1 | | 4/2018 | | |
| WO | 2020/008225 A1 | | 1/2020 | | |

OTHER PUBLICATIONS

T. Levin, "Car companies stand to make billions by charging you monthly fees for add-on features like heated seats", Feb. 5, 2022, Business Insider, https://www.businessinsider.com/car-feature-subscriptions-add-ons-bmw-ford-toyota-gm-2022-2 (Year: 2022).*

Japanese Office Action for Japanese Patent Application No. 2022155271 mailed Oct. 4, 2024 (partially translated).

Non-Final Office Action for U.S. Appl. No. 18/370,078 mailed May 21, 2025.

Japanese Office Action for Japanese Patent Application No. 2022155272 mailed Jan. 15, 2024 (partially translated).

U.S. Appl. No. 18/370,078, filed Sep. 19, 2023.

Japanese Office Action for Japanese Patent Application No. 2022155272 mailed Mar. 25, 2024 (partially translated).

Japanese Office Action for Japanese Patent Application No. 2022155271 mailed Apr. 5, 2024 (partially translated).

* cited by examiner

F I G. 1

F I G. 5
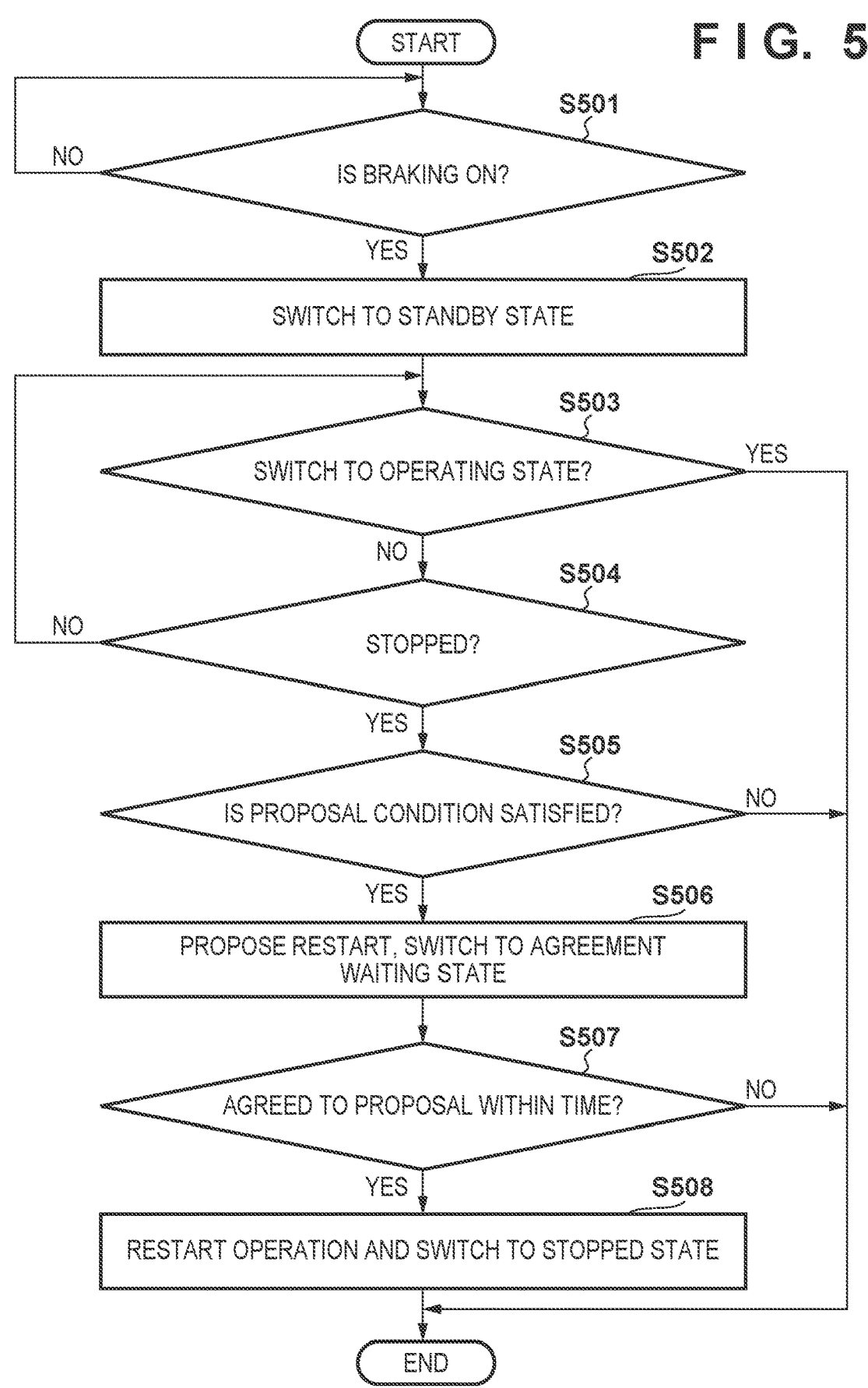

F I G.  6B
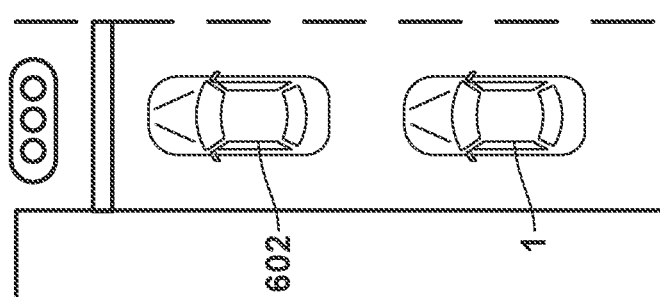
F I G.  6A
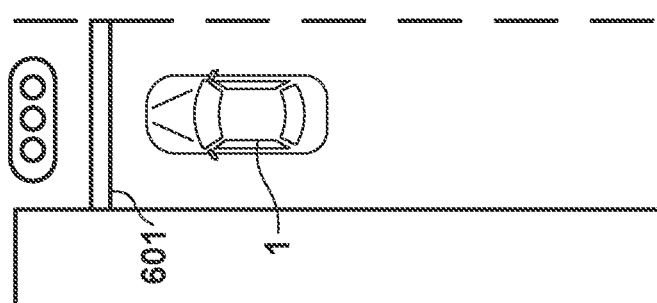

CONTROL DEVICE AND CONTROL METHOD FOR RESTART OF SPEED CONTROL OF A VEHICLE

CROSS-REFERENCE TO RELATED APPLICATION(S)

This application claims priority to and the benefit of Japanese Patent Application No. 2022-155271, filed Sep. 28, 2022, the entire disclosure of which is incorporated herein by reference.

BACKGROUND OF THE INVENTION

Field of the Invention

The present invention relates to a control device and a control method for a vehicle.

Description of the Related Art

A function called adaptive cruise control (ACC) for automatically controlling a speed of a vehicle has been put into practical use. Under the ACC, the speed of the vehicle is controlled in such a manner that if there is a preceding vehicle, the vehicle follows the preceding vehicle, and if there is no preceding vehicle, the vehicle travels at a set speed. When the vehicle is stopped as the preceding vehicle is stopped, the vehicle is started in accordance with an instruction from a driver. Japanese Patent No. 4230385 describes that an instruction for starting a vehicle is acquired from a driver before a preceding vehicle is started. When the vehicle is stopped by the operation of the driver while the speed of the vehicle is automatically controlled, the automatic control of the speed is interrupted. In the conventional art, the automatic control of the speed is restarted as the driver operates a button.

SUMMARY OF THE INVENTION

Some aspects of the present disclosure propose a technique for restarting automatic control of a speed of a vehicle with a simple operation when the vehicle is stopped. According to an embodiment, a control device for a vehicle, the control device comprising: a travel control unit configured to provide a speed control function for automatically controlling a speed of the vehicle, the travel control unit configured to interrupt an operation of the speed control function in response to a braking operation element of the vehicle being operated by a driver during the operation of the speed control function; and a proposal unit configured to provide a restart proposal to the driver to restart the operation of the speed control function when the driver stops the vehicle while the operation of the speed control function is interrupted, wherein when the driver agrees with the restart proposal, the travel control unit restarts the operation of the speed control function and keeps the vehicle stopped by the speed control function, and the agreement with the restart proposal is made by the driver terminating an operation of the braking operation element is provided.

BRIEF DESCRIPTION OF THE DRAWINGS

FIG. 1 is a schematic diagram illustrating an example of a configuration of a vehicle according to some embodiments;

FIG. 5 is a flowchart illustrating an example of an operation of the speed control function according to some embodiments; and FIGS. 6A and 6B are schematic diagrams illustrating examples of proposal conditions according to some embodiments.

DESCRIPTION OF THE EMBODIMENTS

Figure 2:
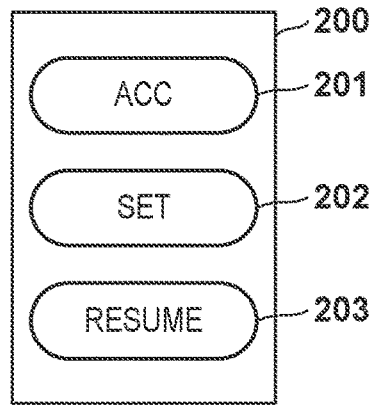
FIG. 2 is a schematic diagram illustrating a panel for operating a speed control function according to some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
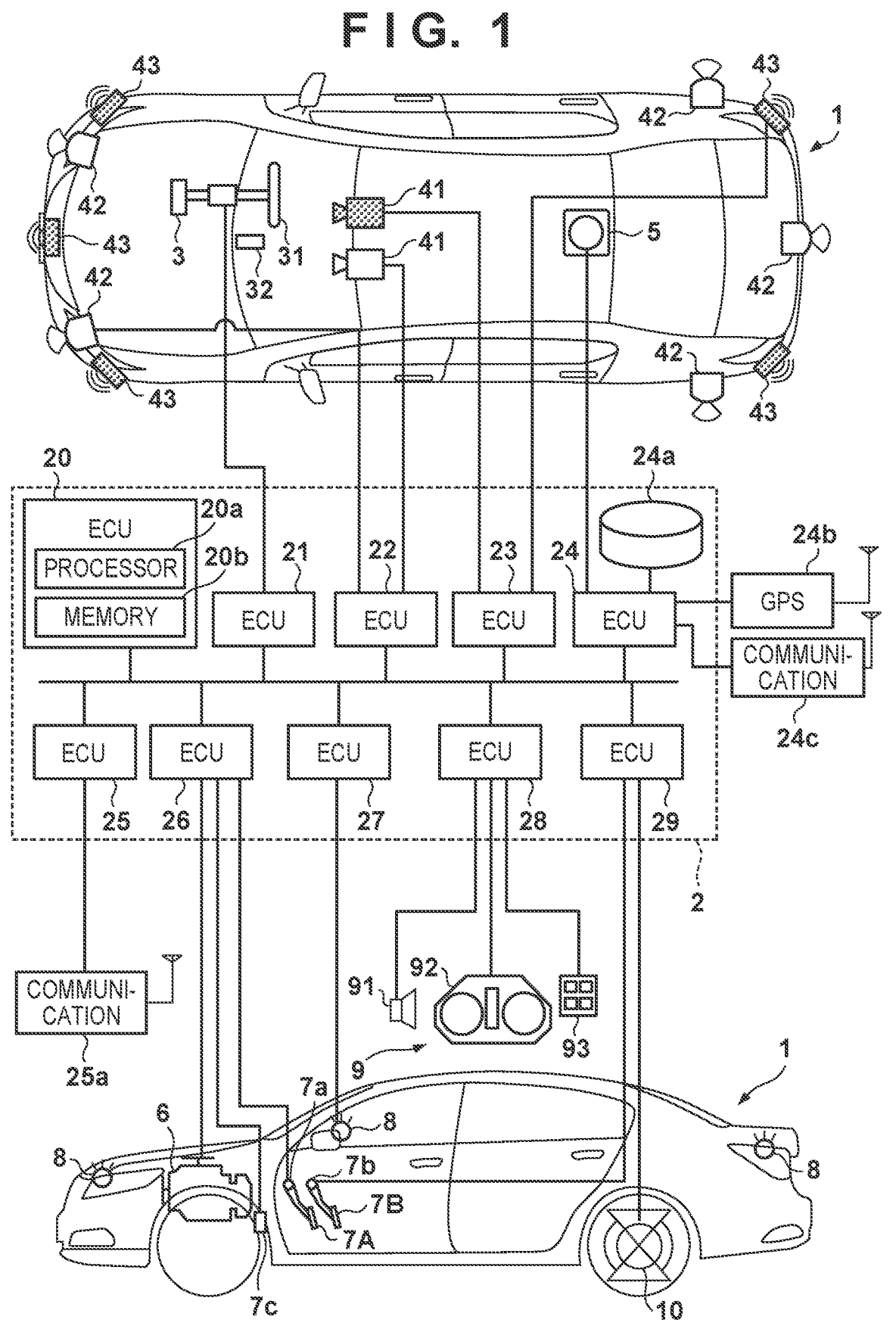

FIG. 1 is a block diagram of a vehicle 1 according to an embodiment of the present invention. In FIG. 1, the vehicle 1 is schematically illustrated in a plan view and in a side view. The vehicle 1 is, for example, a sedan-type four-wheeled passenger vehicle. The vehicle 1 may be such a four-wheeled vehicle, a two-wheeled vehicle, or another type of vehicle.

The vehicle 1 includes a vehicle control device 2 (hereinafter, simply referred to as a control device 2) that controls the vehicle 1. The control device 2 includes a plurality of electronic control units (ECUs) 20 to 29 communicably connected to each other through an in-vehicle network. Each of the ECUs includes a processor represented by a central processing unit (CPU), a memory such as a semiconductor memory, an interface with an external device, and the like. The memory stores a program to be executed by the processor, data to be used for processing by the processor, and the like. Each of the ECUs may include a plurality of processors, memories, interfaces, and the like. For example, the ECU 20 includes a processor 20a and a memory 20b. The ECU 20 executes processing by the processor 20a executing a command included in the program stored in the memory 20b. Alternatively, the ECU 20 may include a dedicated integrated circuit such as an application specific integrated circuit (ASIC) or a field programmable gate array (FPGA) for causing the ECU 20 to execute processing. The same applies to other ECUs.

Hereinafter, functions and the like assigned to the ECUs 20 to 29 will be described. Note that the number of ECUs and functions assigned to the ECUs can be appropriately designed, and can be subdivided or integrated as compared with those in the present embodiment.

The ECU 20 executes control related to automated traveling of the vehicle 1. For automated driving, at least one of steering and acceleration/deceleration of the vehicle 1 is automatically controlled. The automated traveling by the ECU 20 may include automated traveling that does not require a driver to perform a traveling operation (which may also be referred to as automated driving) and automated traveling for assisting the driver in performing a traveling operation (which may also be referred to as driving assistance).

The ECU 21 controls an electric power steering device 3. The electric power steering device 3 includes a mechanism that steers front wheels in accordance with a driver's driving operation (steering operation) on a steering wheel 31. In addition, the electric power steering device 3 includes a motor that exerts a driving force for assisting the steering operation or automatically steering the front wheels, a sensor that detects a steering angle, and the like. When a driving state of the vehicle 1 is automated driving, the ECU 21 automatically controls the electric power steering device 3 in response to an instruction from the ECU 20 and controls a traveling direction of the vehicle 1.

The ECUs 22 and 23 control detection units 41 to 43 that detect a situation around the vehicle 1, and perform information processing on detection results. The detection units 41 are cameras that capture images in front of the vehicle 1 (which may also hereinafter be referred to as cameras 41), and are attached to a windshield on the interior side of the vehicle at the front of the roof of the vehicle 1 in the present embodiment. By analyzing the images captured by the cameras 41, it is possible to extract a contour of a target object or a lane division line (white line or the like) on a road.

The detection units 42 are light detection and rangings (LiDARs) (which may also hereinafter be referred to as LiDARs 42), and detect a target object around the vehicle 1, or measures a distance to the target object. In the present embodiment, five LiDARs 42 are provided, including one at each corner of the front portion of the vehicle 1, one at the center of the rear portion of the vehicle 1, and one on each lateral side of the rear portion of the vehicle 1. The detection units 43 are millimeter-wave radars (which may also hereinafter be referred to as radars 43), and detect a target object around the vehicle 1 or measure a distance to the target object. In the present embodiment, five radars 43 are provided, including one at the center of the front portion of the vehicle 1, one at each corner of the front portion of the vehicle 1, and one at each corner of the rear portion of the vehicle 1.

The ECU 22 controls one camera 41 and each LiDAR 42, and performs information processing on detection results. The ECU 23 controls the other camera 41 and each radar 43, and performs information processing on detection results. By providing two sets of devices for detecting a situation around the vehicle 1, the reliability of the detection results can be improved. By providing different types of detection units such as cameras, LiDARs, and radars, the surrounding environment of the vehicle 1 can be analyzed in multiple ways.

The ECU 24 controls a gyro sensor 5, a global navigation satellite system (GNSS) sensor 24b, and a communication device 24c, and performs information processing on detection results or communication results. The gyro sensor 5 detects a rotational movement of the vehicle 1. A track of the vehicle 1 can be determined based on a detection result of the gyro sensor 5, a wheel speed, and the like. The GNSS sensor 24b detects a current location of the vehicle 1. The communication device 24c performs wireless communication with a server that provides map information and traffic information to acquire such information therefrom. The ECU 24 can access a database 24a in which map information is stored, and the ECU 24 searches for a route from a current location to a destination. The ECU 24, the database 24a, and the GNSS sensor 24b constitute a so-called navigation device.

The ECU 25 includes a communication device 25a for inter-vehicle communication. The communication device 25a performs wireless communication with other surrounding vehicles to exchange information between the vehicles.

The ECU 26 controls a power plant 6. The power plant 6 is a mechanism that outputs a driving force for rotating driving wheels of the vehicle 1, and includes, for example, an engine and a transmission. For example, the ECU 26 controls an output of the engine according to a driver's driving operation (accelerator operation or acceleration operation) detected by an operation detection sensor 7a provided on an accelerator pedal 7A, or switches a gear ratio of the transmission based on information such as a vehicle speed detected by a vehicle speed sensor 7c. When a driving state of the vehicle 1 is automated driving, the ECU 26 automatically controls the power plant 6 in response to an instruction from the ECU 20 to control the vehicle 1 to be accelerated or decelerated. The transmission switches a combination of gears according to a shift position designated by the driver using a shift lever 32. The shift position may include, for example, drive, neutral, reverse, parking, and the like. The shift position may be designated using another device, e.g., a shift switch, instead of the shift lever 32.

The ECU 27 controls lighting devices (headlights, taillights, and the like) including turn indicators 8 (winkers). In the example of FIG. 1, the turn indicators 8 are provided at the front portion, the door mirrors, and the rear portion of the vehicle 1.

The ECU 28 controls an input/output device 9. The input/output device 9 outputs information to the driver, and receives information input from the driver. A voice output device 91 notifies the driver of information by voice. A display device 92 notifies the driver of information by displaying an image. The display device 92 is disposed, for example, in front of a driver's seat, and constitutes an instrument panel or the like. Note that, although the voice and the display have been given as examples here, information may also be notified by vibration or light. In addition, information may be notified by a combination of two or more of voice, display, vibration, and light. Furthermore, the combination or the mode of notification may be changed depending on the level (e.g., the degree of urgency) of information to be notified. An input device 93 is a group of switches disposed at driver-operable positions to give an instruction to the vehicle 1, and may also include a voice input device.

The ECU 29 controls a brake device 10 and a parking brake (not illustrated). The brake device 10 is, for example, a disc brake device, and is provided on each wheel of the vehicle 1 to apply resistance against a rotation of the wheel to decelerate or stop the vehicle 1. The ECU 29 controls the operation of the brake device 10 in response to a driver's driving operation (braking operation) detected by an operation detection sensor 7b provided on a brake pedal 7B, for example. When a driving state of the vehicle 1 is automated driving, the ECU 29 automatically controls the brake device 10 in response to an instruction from the ECU 20 to control the vehicle 1 to be decelerated and stopped. The brake device 10 and the parking brake can also be operated to keep the vehicle 1 in the stopped state. In a case where the transmission of the power plant 6 includes a parking lock mechanism, the parking lock mechanism can also be operated to keep the vehicle 1 in the stopped state.

The control device 2 (e.g., the ECU 20) of the vehicle 1 may provide a speed control function. The speed control function is a function of automatically controlling the speed of the vehicle 1. The control device 2 may automatically control the speed of the vehicle 1 based on a set speed or a speed of a preceding vehicle. Specifically, when a speed of a vehicle preceding the vehicle 1 is equal to or lower than a set speed, the control device 2 automatically controls the speed of the vehicle 1 to follow the preceding vehicle. When there is no preceding vehicle, the control device 2 automatically controls the speed of the vehicle 1 to reach the set speed. Such a speed control function may also be referred to as adaptive cruise control (ACC). The automatic control of the speed of the vehicle 1 may be performed by the control device 2 automatically controlling the driving and braking of the vehicle 1. While the speed control function is being executed, the steering of the vehicle 1 may be performed by the driver operating the steering wheel 31.

With reference to FIG. 2, hardware for the control device 2 to acquire an instruction related to the speed control function from a driver will be described. The vehicle 1 may include an operation panel 200 for receiving an instruction related to the speed control function. The operation panel 200 may be mounted on, for example, an instrument panel of the vehicle 1 or may be mounted on the steering wheel 31. The operation panel 200 includes a start button 201, a setting button 202, and a restart button 203. The operation panel 200 may include other buttons. In the example of FIG. 2, an instruction related to the speed control function is acquired by a button. Alternatively, an instruction related to the speed control function may be acquired by another type of hardware, for example, a lever or a virtual button on a touch panel.

The start button 201 is a button for switching on/off the speed control function. When the start button 201 is pressed in a state where the speed control function is switched off, the control device 2 switches on the speed control function (that is, actuates the speed control function). When the start button 201 is pressed in a state where the speed control function is switched on, the control device 2 switches off the speed control function (that is, stops the speed control function). In the example of the operation panel 200, the speed control function is switched on/off by one start button 201. Alternatively, the operation panel 200 may include a button for switching on the speed control function and a button for switching off the speed control function separately.

The setting button 202 is a button for newly setting the set speed and switching the speed control function to an operating state. When the setting button 202 is pressed in a state where the speed control function is switched on, the control device 2 starts to automatically control the speed of the vehicle 1 using the speed of the vehicle 1 at that time as the set speed.

The restart button 203 is a button for switching the speed control function to an operating state without newly setting the set speed. When the restart button 203 is pressed in a state where the speed control function is switched on, the control device 2 starts to automatically control the speed of the vehicle 1 using the previous set speed.

Figure 3A:
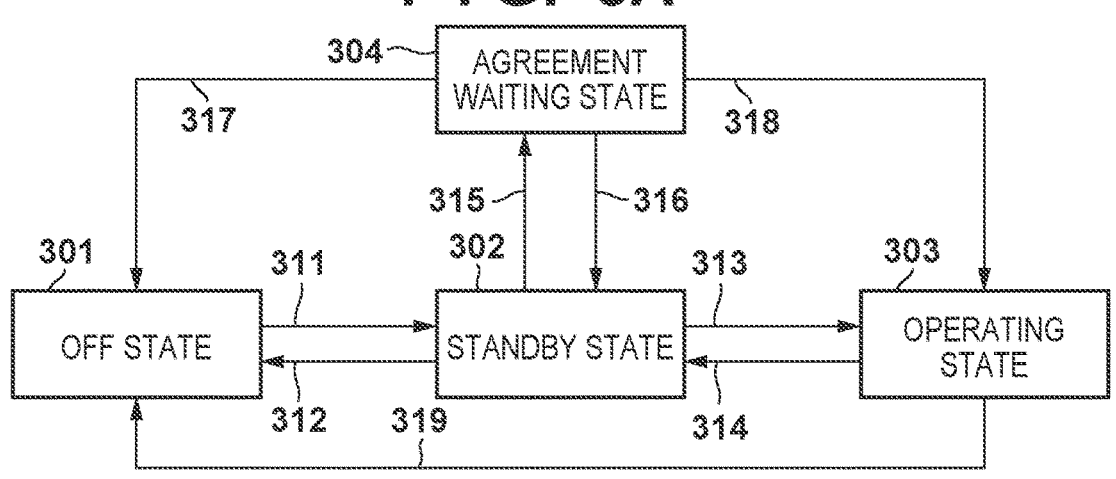
FIGS. 3A and 3B are block diagrams illustrating examples of state transitions of the speed control function according to some embodiments.
Figure 3B:
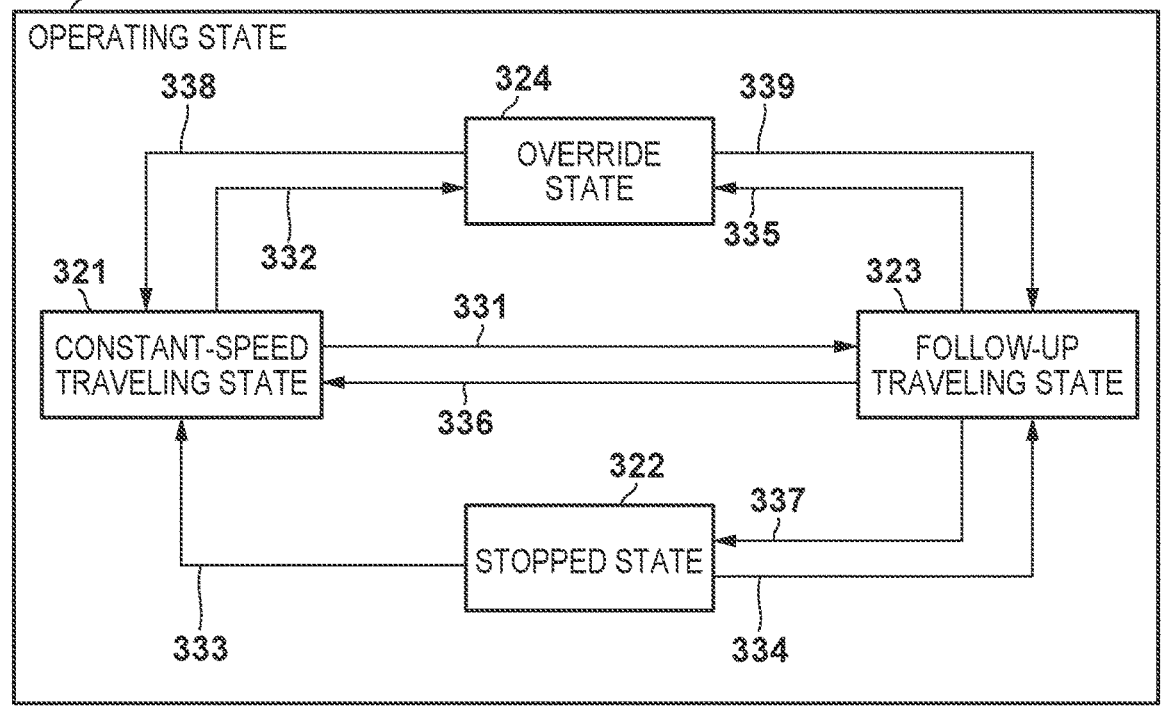

The state transition of the speed control function will be described with reference to FIGS. 3A and 3B. As illustrated in FIG. 3A, the speed control function may take a switch-off state 301, a standby state 302, an operating state 303, and an agreement waiting state 304. The speed control function may take other states. The standby state 302, the operating state 303, and the agreement waiting state 304 may be collectively regarded as a switch-on state.

The switch-off state 301 is a state in which the speed control function is switched off. When the speed control function is in the switch-off state 301, the control device 2 does not perform an operation of automatically controlling the speed of the vehicle 1. When the speed control function is in the switch-off state 301, the control device 2 does not accept an operation using the setting button 202 or the restart button 203, but accepts an operation using the start button 201.

The standby state 302 is a state in which the control device 2 stands by to start the operation of the speed control function. When the speed control function is in the standby state 302, the control device 2 does not perform an operation of automatically controlling the speed of the vehicle 1. When the speed control function is in the standby state 302, the control device 2 accepts an operation using any of the start button 201, the setting button 202, and the restart button 203.

The operating state 303 is a state in which the speed control function is operating. When the speed control function is in the operating state 303, the control device 2 automatically controls the speed of the vehicle 1. When the speed control function is in the operating state 303, the control device 2 accepts an operation using any of the start button 201, the setting button 202, and the restart button 203.

The agreement waiting state 304 is a state in which the control device 2 waits for a driver to agree with a proposal for restarting the operation of the speed control function. Hereinafter, the proposal for restarting the operation of the speed control function will simply be referred to as a restart proposal. When the speed control function is in the agreement waiting state 304, the control device 2 does not perform an operation of automatically controlling the speed of the vehicle 1. When the speed control function is in the agreement waiting state 304, the control device 2 accepts an operation using any of the start button 201, the setting button 202, and the restart button 203.

Next, a transition between states of the speed control function will be described. As indicated by an arrow 311, when the start button 201 is pressed while the speed control function is in the switch-off state 301, the speed control function transitions to the standby state 302. As indicated by an arrow 312, when the start button 201 is pressed while the speed control function is in the standby state 302, the speed control function transitions to the switch-off state 301. As indicated by an arrow 313, when the setting button 202 or the restart button 203 is pressed while the speed control function is in the standby state 302, the speed control function transitions to the operating state 303.

As indicated by an arrow 314, when the brake pedal 7B is operated by the driver while the speed control function is in the operating state 303, the speed control function transitions to the standby state 302. The brake pedal 7B is an example of a braking operation element used by the driver to control the braking force of the vehicle 1. Another braking operation element may be used instead of the brake pedal 7B.

As indicated by an arrow 315, when a condition for providing a restart proposal to the driver is satisfied while the speed control function is in the standby state 302, the speed control function transitions to the agreement waiting state 304. Hereinafter, the condition for providing a restart proposal to the driver will simply be referred to as a proposal condition. A specific example of the proposal condition will be described later. As indicated by an arrow 316, when a predetermined time has elapsed in a state where the driver does not agree with the proposal while the speed control function is in the agreement waiting state 304, the speed control function transitions to the standby state 302. The predetermined time may be, for example, about 5 seconds to 10 seconds.

As indicated by an arrow 317, when the start button 201 is pressed while the speed control function is in the agreement waiting state 304, the speed control function transitions to the switch-off state 301. As indicated by an arrow 318, when the driver agrees with the restart proposal while the speed control function is in the agreement waiting state 304, the speed control function transitions to the operating state 303. The agreement with the restart proposal may be made, for example, by ending the operation of the brake pedal 7B when the vehicle 1 is stopped. Alternatively, the agreement with the restart proposal may be made by pressing the restart button 203. As indicated by an arrow 319, when the start button 201 is pressed while the speed control function is in the operating state 303, the speed control function transitions to the switch-off state 301.

Next, the state transition of the speed control function in the operating state 303 will be described with reference to FIG. 3B. As illustrated in FIG. 3B, the speed control function in the operating state 303 can take a constant-speed traveling state 321, a stopped state 322, a follow-up traveling state 323, and an override state 324. The speed control function may take other states in the operating state 303.

The constant-speed traveling state 321 is a state in which the control device 2 automatically controls the speed of the vehicle 1 to reach the set speed. The stopped state 322 is a state in which the vehicle 1 is stopped by the control device 2 automatically applying a braking force without an operation of the brake pedal 7B by the driver.

The follow-up traveling state 323 is a state in which the control device 2 automatically controls the speed of the vehicle 1 to follow a preceding vehicle. The vehicle 1 following the preceding vehicle means that the vehicle 1 travels in such a manner that an inter-vehicle distance from the preceding vehicle becomes a predetermined inter-vehicle distance. The predetermined inter-vehicle distance may be a preset value, and may be changed by the driver. The predetermined inter-vehicle distance may be a constant value or a value corresponding to the speed of the preceding vehicle.

The override state 324 is a state in which the vehicle 1 is traveling according to an operation amount of the accelerator pedal 7A operated by the driver. The accelerator pedal 7A is an example of a driving operation element used by the driver to control the driving force of the vehicle 1. Another driving operation element may be used instead of the accelerator pedal 7A. Typically, the speed of the vehicle 1 in the override state 324 is higher than the set speed. When the setting button 202 is pressed in the operating state 303, the set speed is updated to the speed of the vehicle 1 at that time.

Next, a transition between states in the operating state 303 will be described. As indicated by an arrow 331, when a preceding vehicle appears in front of the vehicle 1 while the speed control function is in the constant-speed traveling state 321, the speed control function transitions to the follow-up traveling state 323. The preceding vehicle in the speed control function is a vehicle traveling in front of the vehicle 1 within a predetermined inter-vehicle distance. For example, when another vehicle changes the lane to a lane in front of the vehicle 1 from another lane or when the vehicle 1 catches up with another vehicle traveling in front of the vehicle 1, the speed control function transitions from the constant-speed traveling state 321 to the follow-up traveling state 323.

As indicated by an arrow 332, when the driver starts operating the accelerator pedal 7A while the speed control function is in the constant-speed traveling state 321, the speed control function transitions to the override state 324. As indicated by an arrow 333, when the driver gives a start instruction while the speed control function is in the stopped state 322, if there is no preceding vehicle, the speed control function transitions to the constant-speed traveling state 321. The start instruction given by the driver may be an instruction given by operating the accelerator pedal 7A, an instruction given by pressing the restart button 203, or an instruction by voice. As indicated by an arrow 334, when the driver gives a start instruction while the speed control function is in the stopped state 322, if there is a preceding vehicle, the speed control function transitions to the follow-up traveling state 323. The start instruction given by the driver may be an instruction given by operating the accelerator pedal 7A, an instruction given by pressing the restart button 203, or an instruction by voice. In this manner, when the vehicle 1 is kept stopped by the speed control function, the control device 2 starts the vehicle 1 based on an instruction from the driver.

As indicated by an arrow 335, when the driver starts operating the accelerator pedal 7A while the speed control function is in the follow-up traveling state 323, the speed control function transitions to the override state 324. As indicated by an arrow 336, when there is no preceding vehicle while the speed control function is in the follow-up traveling state 323, the speed control function transitions to the constant-speed traveling state 321. For example, when the preceding vehicle changes the lane to another lane or when the speed of the preceding vehicle becomes faster than the set speed, the speed control function transitions from the follow-up traveling state 323 to the constant-speed traveling state 321.

As indicated by an arrow 337, when the vehicle 1 is stopped while the speed control function is in the follow-up traveling state 323, the speed control function transitions to the stopped state 322. For example, when the preceding vehicle is stopped, the vehicle 1 is also stopped accordingly. As indicated by an arrow 338, when the driver terminates the operation of the accelerator pedal 7A while the speed control function is in the override state 324, if there is no preceding vehicle, the speed control function transitions to the constant-speed traveling state 321. As indicated by an arrow 339, when the driver terminates the operation of the accelerator pedal 7A while the speed control function is in the override state 324, if there is a preceding vehicle, the speed control function transitions to the follow-up traveling state 323.

Figure 4:
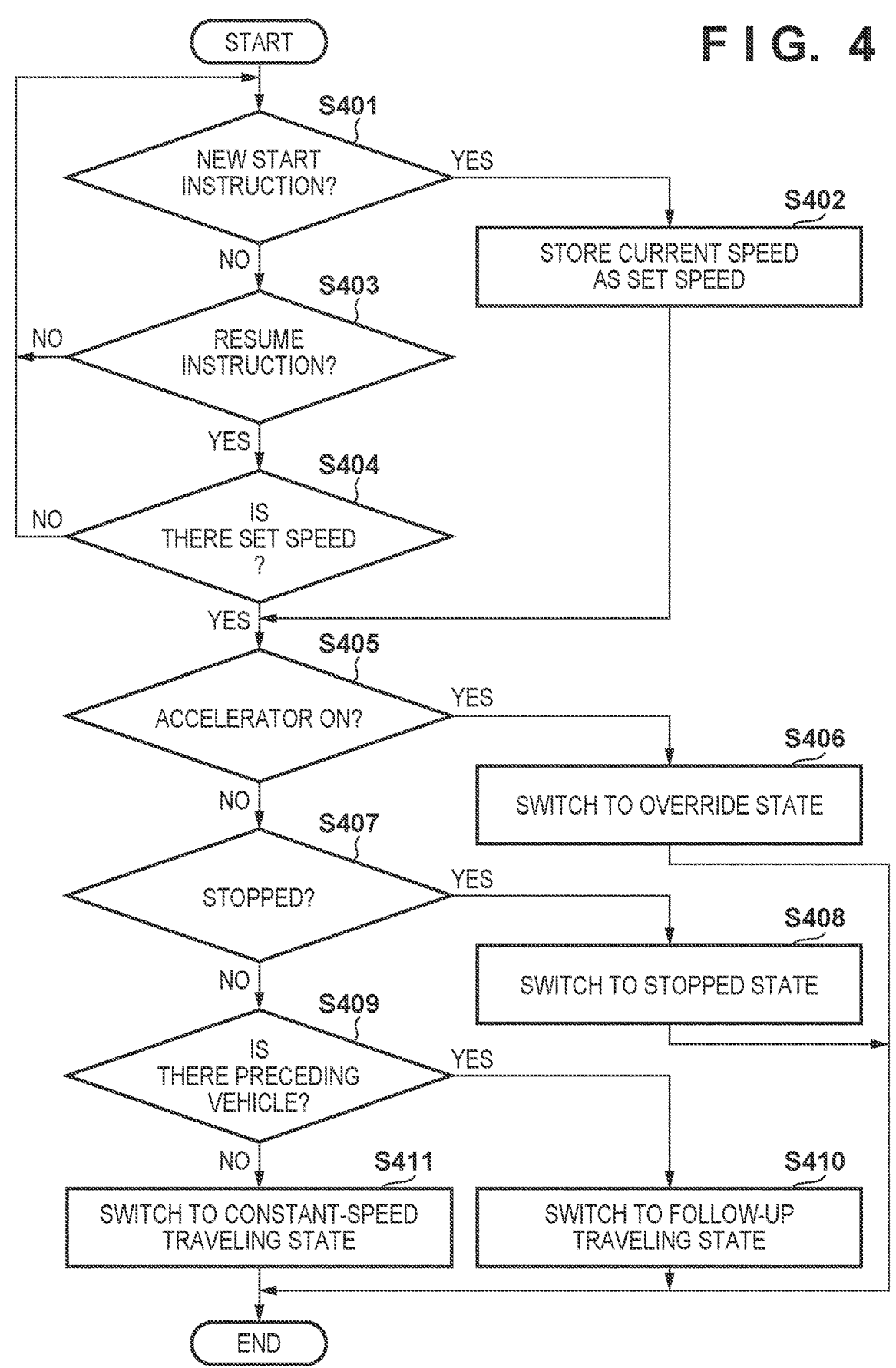
FIG. 4 is a flowchart illustrating an example of an operation of the speed control function according to some embodiments.

A specific example of an operation of the control device 2 for the transition indicated by the arrow 313 in FIG. 3A will be described with reference to FIG. 4. Each step of FIG. 4 may be performed by a processor (e.g., the processor 20a) of the control device 2 executing a program stored in a memory (e.g., the memory 20b) of the control device 2. Alternatively, each step of FIG. 4 may be performed by a dedicated circuit such as an application-specific integrated circuit (ASIC). The same applies to each step of FIG. 5 to be described later. The operation of FIG. 4 may be started as the speed control function transitions to the standby state 302. While the speed control function is in the standby state 302, the state transition described with reference to FIG. 3A is performed in parallel with the operation described in FIG. 4.

In S401, the control device 2 determines whether an instruction to start operating the speed control function at a newly set speed is received. When it is determined that an instruction to start operating the speed control function at a newly set speed is received ("YES" in S401), the control device 2 shifts the process to S402, and otherwise ("NO" in S401), the control device 2 shifts the process to S403. The instruction to start operating the speed control function at a newly set speed may be made, for example, by pressing the setting button 202. In S402, the control device 2 stores the speed of the vehicle 1 at the time of receiving the instruction to start operating the speed control function in a memory (e.g., the memory 20*b*) as a set speed. When the set speed is already stored in the memory, the control device 2 may overwrite the past set speed. When the speed of the vehicle 1 at the time of receiving the instruction to start operating the speed control function is equal to or lower than a threshold value (e.g., 30 km/h), the control device 2 may store a default value (e.g., 30 km/h) as a set speed.

In step S403, the control device 2 determines whether an instruction to start operating the speed control function at a previously set speed is received. When it is determined that an instruction to start operating the speed control function at a previously set speed is received ("YES" in S403), the control device 2 shifts the process to S404, and otherwise ("NO" in S403), the control device 2 shifts the process to S401. The instruction to start operating the speed control function at a previously set speed may be made, for example, by pressing the restart button 203. Although it is described that S403 is performed after S401 in the operation of FIG. 4, these steps may be performed in the reverse order.

In S404, the control device 2 determines whether a set speed is stored in the memory. When it is determined that a set speed is stored in the memory ("YES" in S404), the control device 2 shifts the process to S405, and otherwise ("NO" in S404), the control device 2 shifts the process to S401. When a set speed is not stored in the memory, the control device 2 cannot start operating the speed control function at a previously set speed. Therefore, the control device 2 returns the process to S401 and waits for a new instruction from the driver. At this time, the control device 2 may notify the driver that the speed control function cannot be restarted because no set speed is stored. The control device 2 may shift the process to S402 instead of shifting the process to S401 in S404. In this case, the process is performed as if the driver pressed the setting button 202 rather than the restart button 203.

In step S405, the control device 2 determines whether the driver is operating the accelerator pedal 7A. When it is determined that the driver is operating accelerator pedal 7A ("YES" in S405), the control device 2 shifts the process to S406, and otherwise ("NO" in S405), the control device 2 shifts the process to S407. In S406, the control device 2 changes the speed control function to the override state 324. With this transition, the operation in the standby state 302 ends.

In S407, the control device 2 determines whether the vehicle 1 is stopped. When it is determined that the vehicle 1 is stopped ("YES" in S407), the control device 2 shifts the process to S408, and otherwise ("NO" in S407), the control device 2 shifts the process to S409. In S408, after applying a braking force to the vehicle 1, the control device 2 shifts the speed control function to the stopped state 322 as the driver terminates the operation of the brake pedal 7B. With this transition, the operation in the standby state 302 ends.

In S409, the control device 2 determines whether there is a preceding vehicle. When it is determined that there is a preceding vehicle ("YES" in S409), the control device 2 shifts the process to S410, and otherwise ("NO" in S409), the control device 2 shifts the process to S411. In S410, the control device 2 shifts the speed control function to the follow-up traveling state 323. In S411, the control device 2 shifts the speed control function to the constant-speed traveling state 321. With these transitions, the operation in the standby state 302 ends.

An example of an operation of the control device 2 while the speed control function is in the operating state 303 will be described with reference to FIG. 5. The operation of FIG. 5 may be started as the speed control function transitions to the operating state 303. As described above, the transition to the operating state 303 may be performed by pressing the setting button 202 or the restart button 203 in the standby state 302, and as the driver agrees with a restart proposal in the agreement waiting state 304. While the speed control function is in the operating state 303, the state transition described with reference to FIGS. 3A and 3B is performed in parallel with the operation to be described below.

In step S501, the control device 2 determines whether the driver operates the brake pedal 7B. When it is determined that the driver operates the brake pedal 7B ("YES" in S501), the control device 2 shifts the process to S502, and otherwise ("NO" in S501), the control device 2 repeats S501. In S502, the control device 2 shifts the speed control function to the standby state 302. In this manner, the control device 2 interrupts the operation of the speed control function as the brake pedal 7B of the vehicle 1 is operated by the driver during the operation of the speed control function. In the following steps, since the speed control function is in the standby state 302, the state transition described with reference to FIG. 3A and the operation described with reference to FIG. 4 are performed in parallel with the operation to be described below.

In S503, the control device 2 determines whether the speed control function has transitioned to a state other than the standby state. When it is determined that the speed control function has transitioned to a state other than the standby state ("YES" in S503), the control device 2 ends the process, and otherwise ("NO" in S503), the control device 2 shifts the process to S504. The state transition of FIG. 3A performed in parallel with the operation of FIG. 5 may cause the speed control function to transition to the switch-off state 301 or the operating state 303. In this case, the control device 2 ends the process of FIG. 5. In this case, the control device 2 does not make a restart proposal (S506) to be described later.

In step S504, the control device 2 determines whether the vehicle 1 has stopped. When it is determined that the vehicle 1 has stopped ("YES" in S504), the control device 2 shifts the process to S505, and otherwise ("NO" in S504), the control device 2 shifts the process to S503. Since the speed control function is in the standby state 302, the vehicle 1 is stopped as the driver operating the brake pedal 7B. In this manner, when the driver stops the vehicle 1 while the operation of the speed control function is interrupted, the control device 2 provides a restart proposal to the driver.

In S505, the control device 2 determines whether a proposal condition is satisfied. When it is determined that a proposal condition is satisfied ("YES" in S505), the control device 2 shifts the process to S506, and otherwise ("NO" in S505), the control device 2 ends the process. A specific example of the proposal condition will be described later.

In S506, the control device 2 makes a restart proposal, and shifts the speed control function to the agreement waiting state 304. Specifically, the restart proposal may be made by displaying on the display device 92 a message indicating that the speed control function can transition to the operating state 303 by terminating the operation of the brake pedal 7B. Alternatively or additionally, the restart proposal may be made by providing the message by voice to the driver. The control device 2 may apply a braking force to the vehicle 1 in the agreement waiting state 304 so that the vehicle 1 can be kept in the stopped state even if the driver terminates the operation of the brake pedal 7B.

In step S507, the control device 2 determines whether the driver agrees with the restart proposal. When it is determined that the driver agrees with the restart proposal ("YES" in S507), the control device 2 shifts the process to S508, and otherwise ("NO" in S507), the control device 2 ends the process. The agreement with the restart proposal may be made as the driver terminates the operation of the brake pedal 7B within a predetermined time (e.g., 5 seconds to 10 seconds). As a result, the driver can restart the operation of the speed control function with a simple operation. As described above, since the control device 2 applies a braking force to the vehicle 1 in the agreement waiting state 304, the vehicle 1 remains stopped even if the driver terminates the operation of the brake pedal 7B. The agreement with the restart proposal may be made as the driver presses the restart button 203 within the predetermined time. The control device 2 may determine that the driver does not agree with the restart proposal when the driver does not perform a specific operation (for example, when the driver does not terminate the operation of the brake pedal 7B) within the predetermined time.

In S508, the control device 2 restarts the operation of the speed control function by shifting the speed control function to the operating state 303. In this case, since the vehicle 1 is stopped, the control device 2 shifts the speed control function to the stopped state 322. As described above, in the stopped state 322, the vehicle 1 is kept stopped by the speed control function. When the driver agrees with the restart proposal, the control device 2 restarts the operation of the speed control function using a speed set before the speed control function is interrupted (that is, a set speed stored in the memory).

Next, the proposal condition will be described. As described above, according to some embodiments, when the driver stops the vehicle 1 while the operation of the speed control function is interrupted, the control device 2 provides a restart proposal if a proposal condition is satisfied, and does not provide a restart proposal if a proposal condition is not satisfied. The proposal condition may be a condition satisfied in a situation where it is considered that the driver desires to restart the operation of the speed control function. For example, the proposal condition may be based on the state of the vehicle 1 during a period until the driver stops the vehicle 1 in S504 after the operation of the speed control function is interrupted in S501. In the following description, the period until the driver stops the vehicle 1 in S504 after the operation of the speed control function is interrupted in S501 will be referred to as a stop transition period.

The proposal condition may include that the operation level of the accelerator pedal 7A of the vehicle 1 during the stop transition period is equal to or lower than a threshold value. The operation level of the accelerator pedal 7A may be an operation amount of the accelerator pedal 7A, an operation time of the accelerator pedal 7A, or a combination thereof. The threshold value of the operation level of the accelerator pedal 7A may be zero. That is, the proposal condition may be that the driver have not operated the accelerator pedal 7A during the stop transition period. When the operation level of the accelerator pedal 7A of the vehicle 1 during the stop transition period is higher than the threshold value, there is a high possibility that the driver is trying to drive the vehicle 1 by himself/herself by terminating the operation of the speed control function. Therefore, in such a case, the proposal condition is not satisfied, and a restart proposal may not be provided.

The proposal condition may include that the operation level of the brake pedal 7B of the vehicle 1 during the stop transition period is equal to or lower than a threshold value. The operation level of the brake pedal 7B may be an operation amount of the brake pedal 7B, an operation time of the brake pedal 7B, or a combination thereof. The threshold value of the operation level of the brake pedal 7B may be set to the upper limit of the operation level during normal traveling. When the operation level of the brake pedal 7B of the vehicle 1 during the stop transition period is higher than the threshold value, there is a high possibility that the driver has stopped the vehicle 1 by sudden braking. In such a case, the driver may wish to drive by himself/herself while checking the safety of the surroundings, rather than restarting the operation of the speed control function. Therefore, in such a case, the proposal condition is not satisfied, and a restart proposal may not be provided. From a similar point of view, the proposal condition may include that a collision reduction braking function is not activated during the stop transition period.

The proposal condition may include that the operation level of the steering wheel 31 of the vehicle 1 during the stop transition period is equal to or lower than a threshold value. The operation level of the steering wheel 31 may be an operation amount of the steering wheel 31, an operation time of the steering wheel 31, or a combination thereof. The steering wheel 31 is an example of a steering operation element used by the driver to steer the vehicle 1. The threshold value of the operation level of the steering wheel 31 may be set to the upper limit of the operation level when the vehicle 1 is traveling straight ahead. When the operation level of the steering wheel 31 of the vehicle 1 during the stop transition period is higher than the threshold value, there is a high possibility that a change has occurred in the travel environment of the vehicle 1 due to a left turn, a right turn, or the like. In such a case, the driver may wish to drive by himself/herself while checking the surrounding environment, rather than restarting the operation of the speed control function. Therefore, in such a case, the proposal condition is not satisfied, and a restart proposal may not be provided.

The proposal condition may include that the turn indicator 8 of the vehicle 1 has not been operated during the stop transition period. The operation of the turn indicator 8 may be performed by a blinker lever or a hazard switch. When the turn indicator 8 of the vehicle 1 is operated during the stop transition period, there is a high possibility that a change has occurred in the travel environment of the vehicle 1. In such a case, the driver may wish to drive by himself/herself while checking the surrounding environment, rather than restarting the operation of the speed control function. Therefore, in such a case, the proposal condition is not satisfied, and a restart proposal may not be provided.

The proposal condition may be based on the state of the vehicle 1 during a period until it is determined whether the proposal condition is satisfied in S505 after the driver stops the vehicle 1 in S504. In order to determine the state of the vehicle 1 after the driver stops the vehicle 1 in S504, the control device 2 may determine whether the proposal condition is satisfied in S505 after a predetermined time (e.g., after 5 seconds to 10 seconds) has passed from the stop of the vehicle 1.

The proposal condition may include that the vehicle 1 is located within a predetermined range from the stop line when the vehicle 1 is stopped. The predetermined range may be a range in which the driver is considered to have stopped the vehicle 1 along the stop line, for example, within 2 m before the stop line. When the vehicle 1 is located within the predetermined range from the stop line when the vehicle 1 is stopped, there is a high possibility that the driver has interrupted the speed control function in order to stop vehicle 1 according to the red light. In such a case, the driver may wish to restart the operation of the speed control function. Therefore, in such a case, the proposal condition is satisfied, and a restart proposal may be provided. FIG. 6A illustrates a situation in which the vehicle 1 is located within a predetermined range from the stop line 601 when the vehicle 1 is stopped. In such a case, the control device 2 may determine that the proposal condition is satisfied, and provide a restart proposal accordingly.

The proposal condition may include that there is no preceding vehicle when the vehicle 1 is stopped. When there is a preceding vehicle when the driver stops by his/her operation, the vehicle 1 is considered to have caught up with the preceding vehicle in a stopped state. When the operation of the speed control function is restarted in this state, the control device 2 performs an operation of following the preceding vehicle. However, the driver does not always want to follow the preceding vehicle. Therefore, in such a case, the proposal condition is not satisfied, and a restart proposal may not be provided. FIG. 6B illustrates a situation in which there is a preceding vehicle 602 when the vehicle 1 is stopped. In such a case, the control device 2 may determine that the proposal condition is not satisfied, and may not provide a restart proposal accordingly.

The proposal condition may be based on the state of the vehicle 1 before the operation of the speed control function is interrupted in S501. For example, the proposal condition may include that the operation of the speed control function continues as much as a threshold value or more before the operation of the speed control function is interrupted. The threshold value may be a time (e.g., 30 seconds), a distance (e.g., 100 m), or a combination thereof. For example, when the operation time of the speed control function before the operation of the speed control function is interrupted is short, there is a high possibility that the driver has erroneously started the operation of the speed control function. In such a case, the driver may not wish to restart operation of the speed control function. Therefore, in such a case, the proposal condition is not satisfied, and a restart proposal may not be provided.

The various conditions have been described above as proposal conditions. These conditions may be used in combination. These conditions may be combined by a logical product, may be combined by a logical sum, or may be combined by another logical operation. As described above, by providing a restart proposal under the appropriate proposal condition, it is possible to suppress provision of unnecessary guidance to the driver. Alternatively, in another embodiment, the control device 2 may provide a restart proposal regardless of whether the proposal condition is satisfied.

The proposal condition may include that it is permitted by a provider of the speed control function (e.g., an automobile manufacturer) to provide a restart proposal. For example, the above-described restart proposal may be provided as an optional feature of ACC. The owner of the vehicle 1 may obtain permission to use the optional function from the automobile manufacturer, thereby bringing the control device 2 into a state where the restart proposal described above can be executed. For example, the owner may input a license code through the input device of the vehicle 1, or may receive permission for use from an external server through the communication device 24c of the vehicle 1.

The embodiment has been described above from the viewpoint of ACC under which the speed of the vehicle 1 is automatically controlled based on the set speed or the speed of the preceding vehicle. Instead, the above-described technology is also applicable to a function of automatically controlling the speed of the vehicle 1 based on a speed of the set speed, that is, so-called normal cruise control.

Summary of Embodiments

<Item 1>

A control device (2) for a vehicle (1), the control device comprising:

a travel control unit (20) configured to provide a speed control function for automatically controlling a speed of the vehicle, the travel control unit configured to interrupt an operation of the speed control function in response to a braking operation element (7B) of the vehicle being operated by a driver during the operation of the speed control function; and a proposal unit (28) configured to provide a restart proposal to the driver to restart the operation of the speed control function when the driver stops the vehicle while the operation of the speed control function is interrupted, wherein when the driver agrees with the restart proposal, the travel control unit restarts the operation of the speed control function and keeps the vehicle stopped by the speed control function, and the agreement with the restart proposal is made by the driver terminating an operation of the braking operation element.

According to this item, the automatic control of the speed of the vehicle can be restarted by a simple operation when the vehicle is stopped.

<Item 2>

The control device according to Item 1, wherein when the driver stops the vehicle while the operation of the speed control function is interrupted, the proposal unit provides the restart proposal in a case where a proposal condition is satisfied, and does not provide the restart proposal in a case where the proposal condition is not satisfied.

According to this item, it is possible to suppress provision of unnecessary guidance to the driver.

<Item 3>

The control device according to Item 2, wherein the proposal condition includes one of more of the following conditions:

an operation level of a driving operation element (7A) of the vehicle during a stop transition period until the driver stops the vehicle after the operation of the speed control function is interrupted is equal to or lower than a threshold value;

an operation level of the braking operation element during the stop transition period is equal to or lower than a threshold value;

an operation level of a steering operation element (31) of the vehicle during the stop transition period is equal to or lower than a threshold value; and a turn indicator (8) of the vehicle is not operated during the stop transition period.

According to this item, it is possible to suppress provision of unnecessary guidance to the driver based on the state until the driver stops the vehicle after the operation of the speed control function is interrupted.

<Item 4>

The control device according to Item 2, wherein the proposal condition includes one of more of the following conditions:

the vehicle is located within a predetermined range from a stop line (601) when the vehicle is stopped;

there is no preceding vehicle (602) when the vehicle is stopped; and a shift position of the vehicle is not changed after the vehicle is stopped.

According to this item, it is possible to suppress provision of unnecessary guidance to the driver based on the state after the vehicle is stopped.

<Item 5>

The control device according to Item 2, wherein the proposal condition includes that the operation of the speed control function continues as much as a threshold value or more before the operation of the speed control function is interrupted.

According to this item, it is possible to suppress provision of unnecessary guidance to the driver based on the state before the operation of the speed control function is interrupted.

<Item 6>

The control device according to Item 1, wherein when the vehicle is kept stopped by the speed control function, the travel control unit starts the vehicle based on an instruction from the driver.

According to this item, the vehicle can be started based on the determination of the driver during the operation of the speed control function.

<Item 7>

The control device according to Item 1, wherein when the driver agrees with the restart proposal, the travel control unit restarts the operation of the speed control function using a speed set before the speed control function is interrupted.

According to this item, the speed control function can be restarted at the speed set before the operation of the speed control function is interrupted.

<Item 8>

The control device according to Item 2, wherein the proposal condition includes that it is permitted by a provider of the speed control function to provide the restart proposal.

According to this item, the function can be provided to a user who desires to provide a restart proposal.

<Item 9>

A program for causing a computer to function as the control device according to any one of Items 1-8.

According to this item, the above-described item is in the form of a program.

<Item 10>

A method of controlling a vehicle (1), the method comprising:

providing (S410, S411) a speed control function for automatically controlling a speed of the vehicle;

interrupting (S502) an operation of the speed control function in response to a braking operation element (7B) of the vehicle being operated by a driver during the operation of the speed control function;

providing (S506) a restart proposal to the driver to restart the operation of the speed control function when the driver stops the vehicle while the operation of the speed control function is interrupted; and restarting (S508) the operation of the speed control function and keeping the vehicle stopped by the speed control function when the driver agrees with the restart proposal, wherein the agreement with the restart proposal is made by the driver terminating an operation of the braking operation element.

According to this item, the automatic control of the speed of the vehicle can be restarted by a simple operation when the vehicle is stopped.

The invention is not limited to the foregoing embodiments, and various variations/changes are possible within the spirit of the invention.

What is claimed is:

1. A control device for a vehicle, the control device comprising:

a memory storing instructions, when executed by a processor, cause the processor to:

provide a speed control function for automatically controlling a speed of the vehicle, interrupt an operation of the speed control function in response to a braking operation element of the vehicle being operated by a driver during the operation of the speed control function;

when the driver stops the vehicle while the operation of the speed control function is interrupted, provide a restart proposal to the driver to restart the operation of the speed control function in a case where a proposal condition is satisfied, and cease to provide the restart proposal in a case where the proposal condition is not satisfied; and when the driver agrees with the restart proposal, restart the operation of the speed control function and keep the vehicle stopped by the speed control function, wherein the agreement with the restart proposal is made by the driver terminating an operation of the braking operation element, and the proposal condition includes a turn indicator of the vehicle is not operated during the stop transition period and one or more of the following conditions:

an operation level of a driving operation element of the vehicle during a stop transition period until the driver stops the vehicle after the operation of the speed control function is interrupted is equal to or lower than a threshold value;

an operation level of the braking operation element during the stop transition period is equal to or lower than a threshold value; and an operation level of a steering operation element of the vehicle during the stop transition period is equal to or lower than a threshold value.

2. The control device according to claim 1, wherein the proposal condition further includes one or more of the following conditions:

the vehicle is located within a predetermined range from a stop line when the vehicle is stopped;

there is no preceding vehicle when the vehicle is stopped; and a shift position of the vehicle is not changed after the vehicle is stopped.

3. The control device according to claim 1, wherein the proposal condition includes that the operation of the speed control function continues as much as a threshold value or more before the operation of the speed control function is interrupted.

4. The control device according to claim 1, wherein the instructions, when executed by the processor, further cause the processor to, when the vehicle is kept stopped by the speed control function, start the vehicle based on an instruction from the driver.

5. The control device according to claim 4, wherein the restart operation of the speed control uses a previously set speed subsequent to operator providing instructions to start the vehicle.

6. The control device according to claim 1, wherein the proposal condition includes that it is permitted by a provider of the speed control function to provide the restart proposal.

7. A non-transitory computer-readable storage medium storing a program for causing a computer to function as the control device according to claim 1.

8. A method of controlling a vehicle, the method comprising:

providing a speed control function for automatically controlling a speed of the vehicle;

interrupting an operation of the speed control function in response to a braking operation element of the vehicle being operated by a driver during the operation of the speed control function;

when the driver stops the vehicle while the operation of the speed control function is interrupted, providing a restart proposal to the driver to restart the operation of the speed control function in a case where a proposal condition is satisfied, and ceasing to provide the restart proposal in a case where the proposal condition is not satisfied; and restarting the operation of the speed control function and keeping the vehicle stopped by the speed control function when the driver agrees with the restart proposal, wherein the agreement with the restart proposal is made by the driver terminating an operation of the braking operation element, and the proposal condition includes a turn indicator of the vehicle is not operated during the stop transition period and one or more of the following conditions:

an operation level of a driving operation element of the vehicle during a stop transition period until the driver stops the vehicle after the operation of the speed control function is interrupted is equal to or lower than a threshold value;

an operation level of the braking operation element during the stop transition period is equal to or lower than a threshold value; and an operation level of a steering operation element of the vehicle during the stop transition period is equal to or lower than a threshold value.

* * * * *